United States Patent
Lowe et al.

(10) Patent No.: US 11,169,271 B2
(45) Date of Patent: Nov. 9, 2021

(54) OBSTACLE DETECTION SYSTEMS

(71) Applicant: CYNGN, INC., Menlo Park, CA (US)

(72) Inventors: Michael Lowe, Santa Cruz, CA (US); Ain Mckendrick, Redwood City, CA (US); Andrea Mariotti, Palo Alto, CA (US); Pranav Bajoria, Mountain View, CA (US); Biao Ma, Sunnyvale, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 16/577,616

(22) Filed: Sep. 20, 2019

(65) Prior Publication Data

US 2020/0103532 A1 Apr. 2, 2020

Related U.S. Application Data

(60) Provisional application No. 62/737,445, filed on Sep. 27, 2018.

(51) Int. Cl.
*G01S 17/931* (2020.01)
*G05D 1/02* (2020.01)

(52) U.S. Cl.
CPC .......... *G01S 17/931* (2020.01); *G05D 1/0231* (2013.01); *G05D 1/0257* (2013.01)

(58) Field of Classification Search
CPC ......... B60W 2550/00; B60W 2550/10; B60W 2550/40; B60W 2422/00; B60W 2422/95; G01P 1/00; G01P 1/02; G05D 1/00; G05D 1/02; G05D 1/0202; G05D 1/0231; G05D 1/0246; G05D 1/0251; G05D 1/0257; G01S 17/00; G01S 17/88; G01S 17/89493; G01S 17/931; G01S 17/933; H04N 5/00; H04N 5/23; H04N 5/23238
USPC .......................................................... 701/301
See application file for complete search history.

(56) References Cited

U.S. PATENT DOCUMENTS

| | | | | |
|---|---|---|---|---|
| 10,712,742 B2* | 7/2020 | Valois | .................... | G01S 17/931 |
| 10,939,057 B2* | 3/2021 | Gassend | .................. | G01S 17/89 |
| 2008/0125972 A1* | 5/2008 | Neff | ...................... | B60W 40/02 |
| | | | | 701/300 |
| 2014/0168435 A1* | 6/2014 | Tuhro | .................... | B60Q 5/006 |
| | | | | 348/148 |
| 2016/0016664 A1* | 1/2016 | Basuni | .................. | B64C 39/024 |
| | | | | 244/17.13 |

* cited by examiner

*Primary Examiner* — Anthony R Jimenez
(74) *Attorney, Agent, or Firm* — Maschoff Brennan

(57) ABSTRACT

Virtual bumpers for autonomous vehicles improve effectiveness and safety as such vehicles are operated. One or more sensor systems having a Lidar sensor and a camera sensor determine proximity of objects around the vehicle and facilitate identification of the environment around the vehicle. The sensor systems are placed at various locations around the vehicle. The vehicle identifies an object and one or more properties of the identified object using the sensor systems. Based on the identified object and the properties of the object, a virtual bumper may be created for that object. For example, if the object is identified as another vehicle moving with a certain velocity, the vehicle may determine a minimum space to avoid the other vehicle, either by changing direction or reducing the velocity of the vehicle, with the minimum space constituting a virtual bumper.

13 Claims, 6 Drawing Sheets

OBSTACLE DETECTION SYSTEMS

1. THE FIELD OF THE DISCLOSURE

The present disclosure relates to a virtual bumper for a vehicle.

2. THE RELEVANT TECHNOLOGY

The present disclosure relates to a virtual bumper for a vehicle. For example, the present disclosure may facilitate one or more devices or systems via which an autonomous vehicle (AV) may be provided with virtual bumpers. Such devices may include one or more Light Detection and Ranging (Lidar) systems.

The subject matter claimed herein is not limited to embodiments that solve any disadvantages or that operate only in environments such as those described above. Rather, this section is only provided to illustrate one exemplary technology area where some embodiments described herein may be practiced.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DETAILED DESCRIPTION

The present disclosure may relate to the implementation of virtual bumpers for an AV. For example, one or more sensor systems of a Lidar sensor and a camera sensor may be used to determine proximity of objects around an AV. Such information may be used to operate or control the AV.

Figure 1:
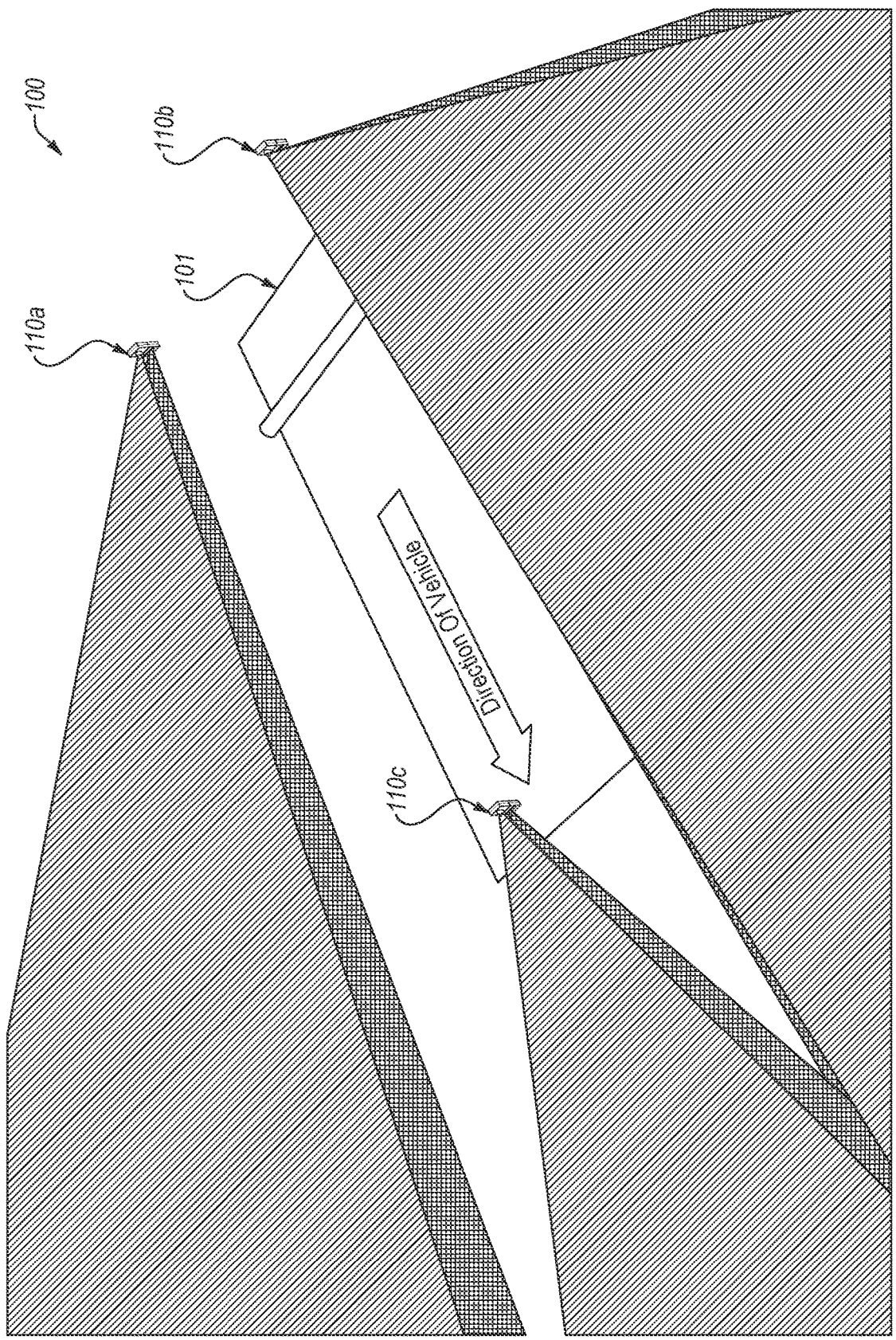
FIG. 1 illustrates an example system of virtual bumpers for a vehicle.

FIG. 1 illustrates an example system 100 of virtual bumpers for a vehicle 101, in accordance with one or more embodiments of the present disclosure. The vehicle 101 may include one or more sensor systems 110 (such as the sensor systems 110a-110c) to facilitate identification of the environment around the vehicle 101.

As illustrated in FIG. 1, the sensor systems 110 may be placed at various locations around the vehicle 101 to facilitate the use of virtual bumpers around the vehicle 101. For example, based on identified objects or features in the environment around the vehicle 101, the vehicle 101 may be configured to utilize virtual bumpers as spaces around the vehicle 101.

In some embodiments, the vehicle 101 may identify an object and one or more properties of the identified object using the sensor systems 110. Based on the identified object and the properties of the object, a virtual bumper may be created for that object. For example, if the object is identified as another vehicle moving with a certain velocity, the vehicle 101 may determine a minimum space to avoid the other vehicle, either by changing direction or reducing the velocity of the vehicle 101. In these and other embodiments, the minimum space may be treated as the virtual bumper. Additionally or alternatively, the virtual bumper may include the minimum space amplified by some other amount such that the vehicle 101 may operate as if the vehicle were larger by the other amount, creating a buffer around the vehicle 101.

In some embodiments, the vehicle 101 may generate and/or maintain a profile of the vehicle 101 to facilitate determination of the minimum space to avoid an object. Such a profile may include braking capabilities of the vehicle 101, a current velocity of the vehicle 101, a current direction of travel of the vehicle 101, etc. In these and other embodiments, the components of the profile may be determined by testing, such as applying brakes of the vehicle 101 at a given speed and determining a distance travelled before coming to a full stop. As another example, if the vehicle 101 is a water craft, the vehicle 101 may put the engines of the vehicle 101 in full reverse when traveling at a certain speed and determine the distance travelled before coming to a full stop. Additionally or alternatively, components of the profile may be determined by utilizing one or more readings of the sensor systems 110. For example, by comparing the location of fixed objects between successive readings of the sensor systems 110, a velocity relative to the fixed objects may be determined using the location of the fixed object and a temporal component between the successive readings.

The vehicle 101 may include any device or system configured to travel by motive force. Examples may include autonomous or semi-autonomous automobiles, scooters, boats, barges, airplanes, drones, etc. In some embodiments, the vehicle 101 may carry passengers, cargo, or any other payload.

In some embodiments, the sensor systems 110 may be placed at various locations for detecting various aspects of the environment. For example, as illustrated in FIG. 1, the sensor systems 110a and 110b may be located at back corners of the vehicle 101 and facing forward to have a viewing region to the side of and in front of the vehicle. As another example, the sensor system 110c may be placed on the front of the vehicle 101 and facing forward to have a viewing region of directly in front of the vehicle 101. In these and other embodiments, the sensor systems 110 may facilitate a view of the majority of spaces around the vehicle 101.

Figure 2:
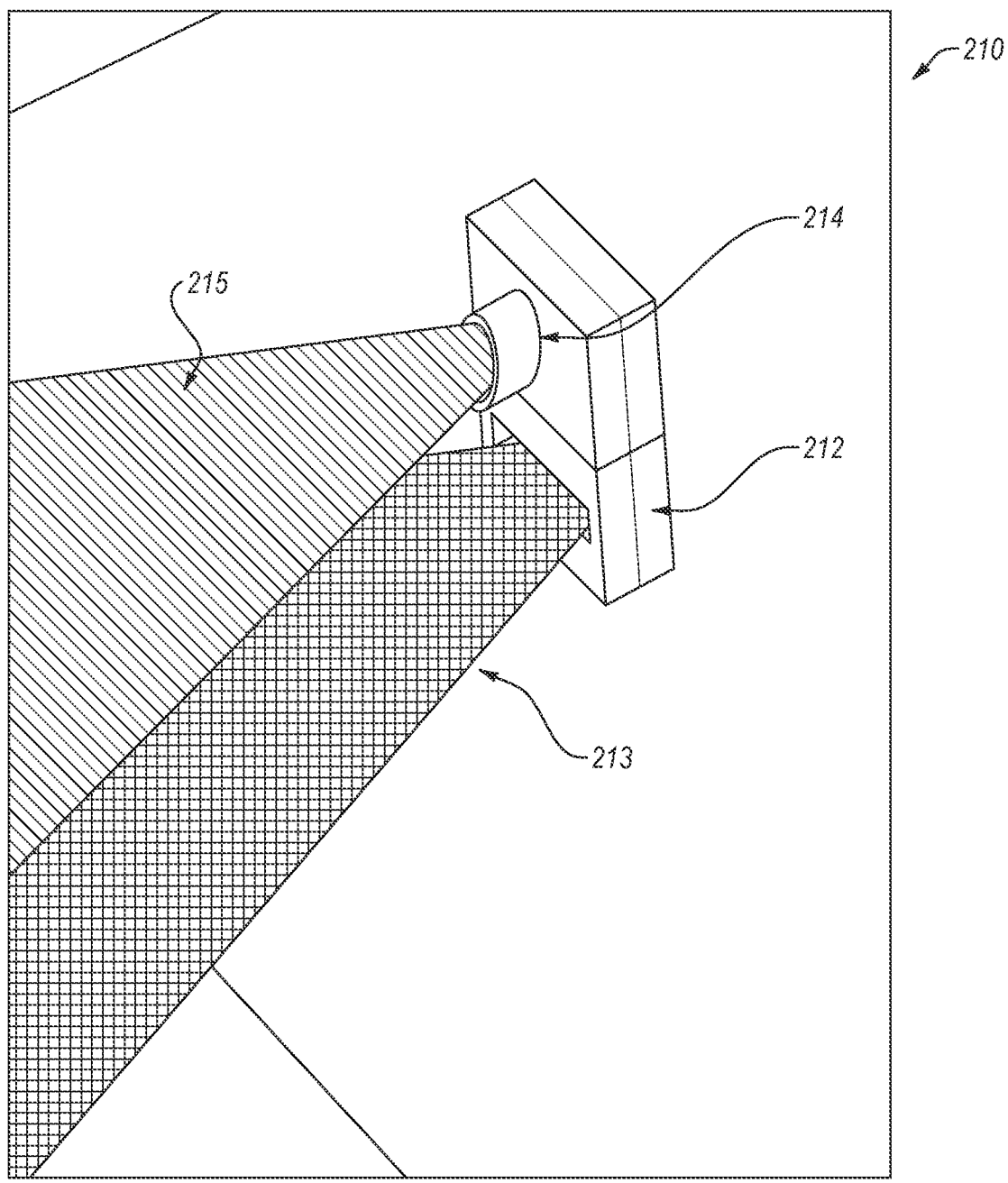
FIG. 2 illustrates an example of a sensor system used to implement a virtual bumper.

FIG. 2 illustrates an example of a sensor system 210 used to implement a virtual bumper, in accordance with one or more embodiments of the present disclosure. The sensor system 210 may be similar or comparable to the sensor system 110 of FIG. 1. In these and other embodiments, the sensor system 110 may include a Lidar device 212 with a Lidar viewing region 213 and a camera device 214 with a camera viewing region 215.

In some embodiments, the Lidar device 212 and the camera device 214 may operate in conjunction to identify an object. For example, the Lidar device 212 may identify a location of the object and a distance of the object from the Lidar device, and the camera device 214 may capture an image of the object. In some embodiments, image recognition may be performed on the image obtained from the camera device 214 to determine a class of the object or the identity of the object (e.g., a person, a tree, another vehicle, a gutter, a cement wall, a street sign, etc.), and the location information from the Lidar device 212 may be combined with the identified object. In these and other embodiments, the identified object may have an expected behavior (e.g., behavior of a person or another vehicle behavior may be erratic but with a tendency to travel in a consistent direction; a tree, a gutter, a cement wall, and a street sign may be stationary; etc.). In these and other embodiments, the expected behavior may impact the minimum distance determination. For example, the minimum distance may be larger for a person compared to the minimum distance for a street sign.

In some embodiments, temporal information may be used in conjunction with the Lidar device 212 and the camera device 214 to determine velocity. For example, the Lidar device 212 may capture data at a known frequency, and compare the location information of a given object between successive data captures to determine the distance the object moved between the two data captures as compared to the time between the two data captures. For a stationary object (e.g., a tree, street sign, etc.), the determined velocity may represent the velocity of the vehicle utilizing the sensor system 210. For moving objects (e.g., another vehicle), the determined velocity may represent a relative velocity as compared to the motion of the vehicle utilizing the sensor system 210. In some embodiments, a combination of velocities for fixed objects and moving objects may be utilized to provide both the velocity of the vehicle using the sensor system 210 based on the fixed objects and a velocity for the moving object based on the combination of the velocity of the vehicle using the sensor system 210 and the velocity using the moving object.

In some embodiments, the Lidar device 212 may include a two-dimensional Lidar such that the Lidar viewing region 213 may be a two-dimensional beam. In some embodiments, the Lidar viewing region 213 may be approximately bumper-height for an automobile. As another example, for water craft, the Lidar viewing region 213 may be placed at a height above an average wave. In these and other embodiments, the use of a two-dimensional Lidar may provide a low-cost alternative to a three-dimensional Lidar system. In particular, by coupling the Lidar device 212 with the camera device 214, a lower cost Lidar system may be used to detect the environment around the vehicle. An example of such a two-dimensional Lidar system may include a Lidar system manufactured by LeddarTech®, as compared to an example three-dimensional Lidar system as manufactured by Velodyne®.

In some embodiments, the camera device 214 may include any device or system configured to capture high resolution color images. In some embodiments, the camera device 214 may be mounted proximate to and/or in a similar orientation with the Lidar device 212. In some embodiments, the camera viewing region 215 may be larger than the Lidar viewing region 213. The camera viewing region 215 may capture areas above and below that captured by the Lidar device 212. For example, the Lidar device 212 may determine that an object is present, and the camera device 214 may capture an entire view of the object, even though only a slice of the object is perceived by the Lidar device 212.

In some embodiments, multiple cameras may be used at different locations such that a stereoscopic image may be utilized to facilitate estimation of distance. For example, using a set of stereoscopic images, an object may be estimated to be 20 feet away, while the Lidar device 214 may detect an object 18.3 feet away. In these and other embodiments, the distance as measured by both sources may facilitate a verification of the distance estimations by the other of the Lidar device 212 and/or the camera device 214. In some embodiments, the vehicle may defer to the Lidar device 212 as being a more accurate determination of the distance to the object.

Figure 3:
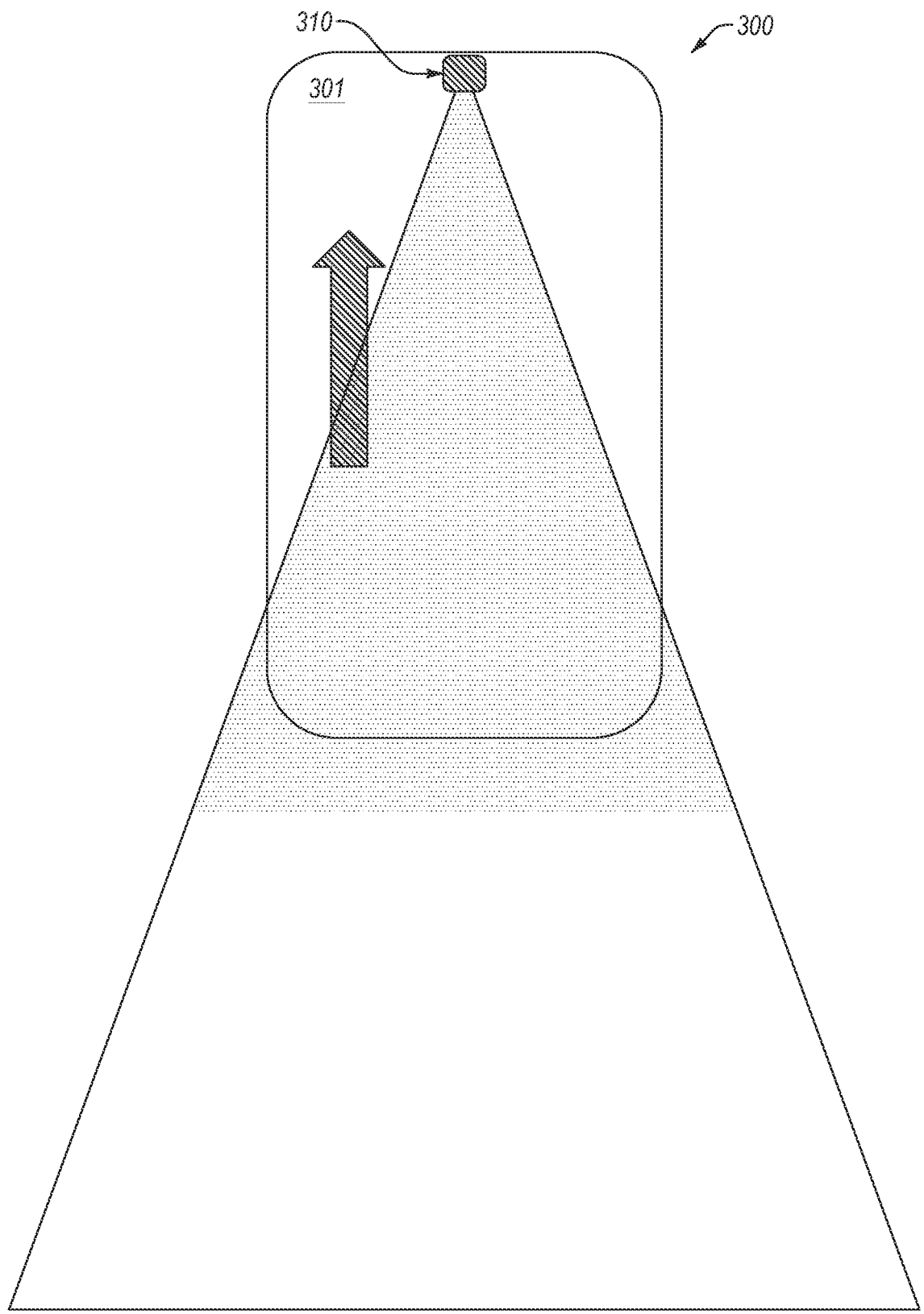
FIG. 3 illustrates an example configuration of sensor systems.

FIG. 3 illustrates an example configuration 300 of a sensor system 310 on a vehicle 301, in accordance with one or more embodiments of the present disclosure. As illustrated in FIG. 3, the vehicle 301 may move in the direction as indicated by the dark arrow. The sensor system 310 may be placed on the front of the vehicle 301 facing in a rearward direction to detect objects behind the vehicle 301.

In some embodiments, the sensor system 310 may be placed to one side of the vehicle 301 towards the front in order to better capture lateral objects approaching the vehicle 301. In these and other embodiments, the configuration 300 may include two or more sensor sensor systems 310 on the front of the vehicle 301 facing backwards, such as one for each side, or one for each side and one in the middle.

Figure 4:
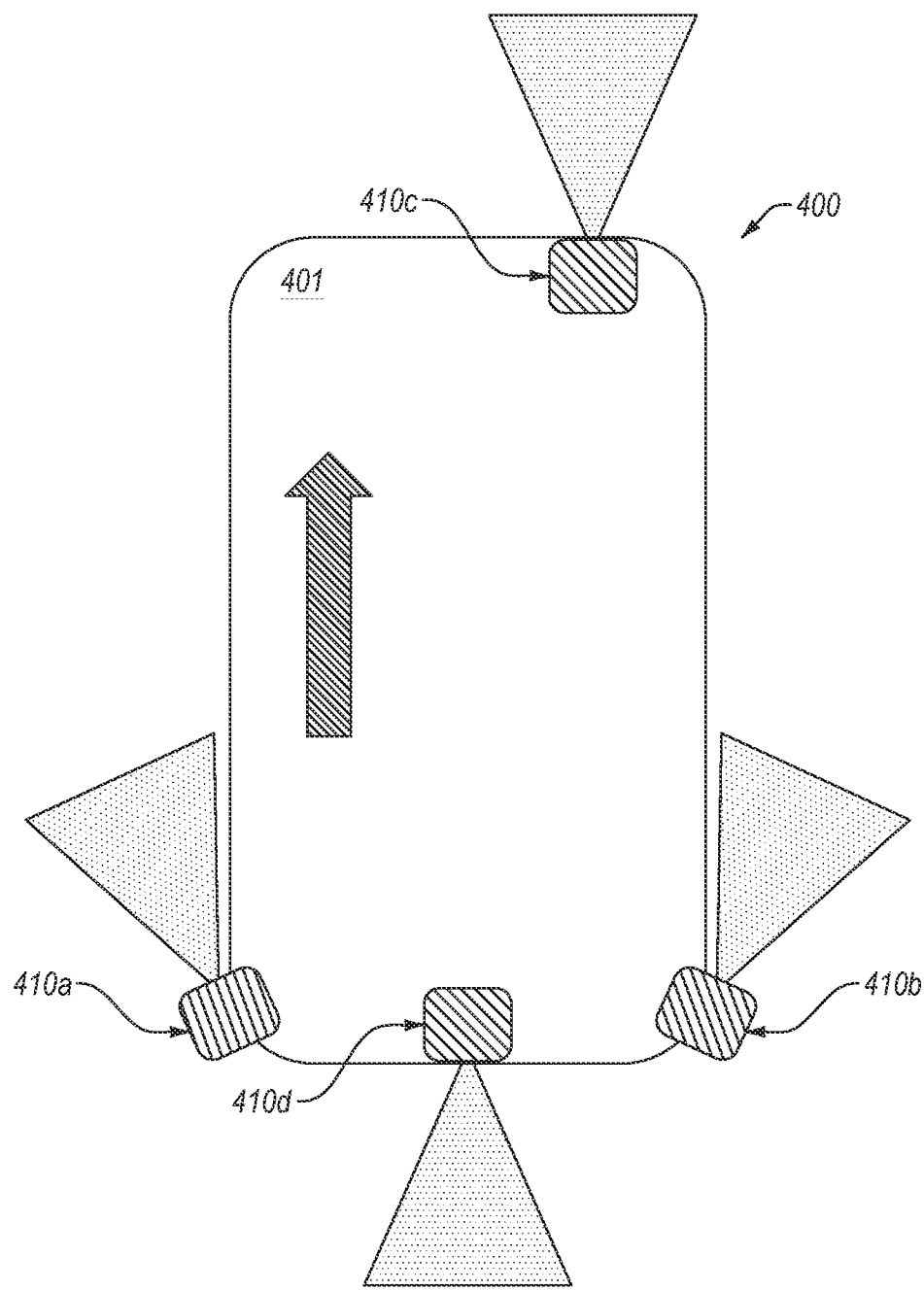
FIG. 4 illustrates another example configuration of sensor systems.

FIG. 4 illustrates another example configuration 400 of sensor systems 410 (such as the sensor systems 410a-410d) on a vehicle 401, in accordance with one or more embodiments of the present disclosure. As illustrated in FIG. 4, the vehicle 401 may move in the direction as indicated by the dark arrow.

As illustrated in FIG. 4, the sensor systems 410 may be placed at various locations around the vehicle 401. For example, the sensor systems 410a and 410b may be placed on the back of the vehicle 401 facing to cover the sides and front of the vehicle 401. As another example, the sensor system 410c may be placed on the front of the vehicle 401 and facing forward to cover the front of the vehicle. As an additional example, the sensor system 410d may be placed on the back of the vehicle 401 facing backwards to cover the back of the vehicle 401.

In these and other embodiments, using multiple low cost sensor systems 410 may provide an approach to determining the environment around the vehicle 401 in a less expensive manner compared to conventional approaches using expensive sensors.

Figure 5:
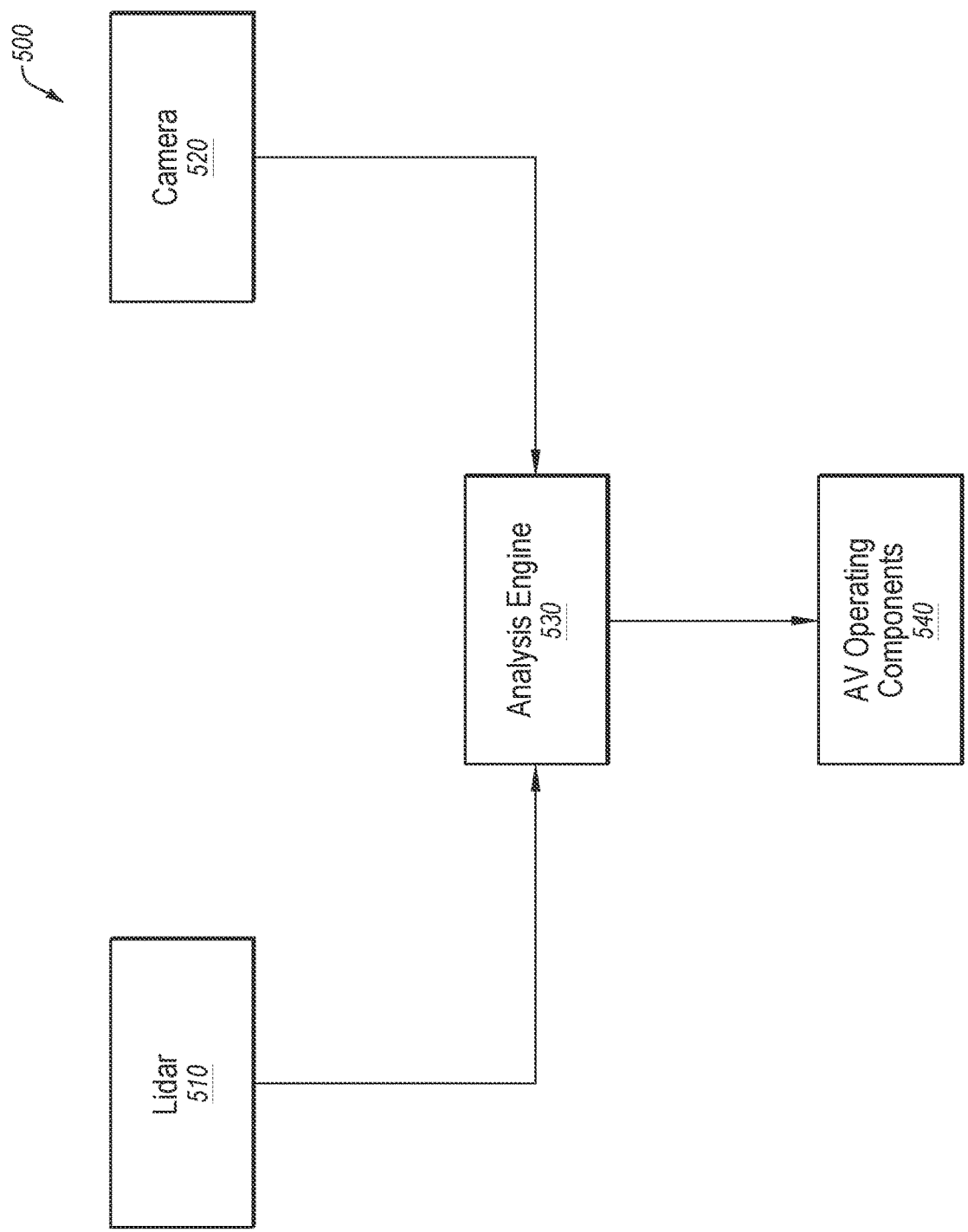
FIG. 5 illustrates another example system of virtual bumpers for a vehicle.

FIG. 5 illustrates another example system 500 of virtual bumpers for a vehicle, in accordance with one or more embodiments of the present disclosure. The system 500 may include a Lidar 510, a camera 520, an analysis engine 530, and one or more automated vehicle (AV) operating components 540.

As illustrated in FIG. 5, the data obtained by the Lidar 510 and/or the camera 520 may be provided to the analysis engine 530 for processing. For example, the analysis engine 530 may perform a determination of a minimum distance before colliding with an object. As another example, the analysis engine 530 may determine the location and/or identity of objects based on the data from the Lidar 510 and the camera 520. As an additional example, the analysis engine 530 may determine the velocities of the vehicle utilizing the Lidar 510 and the camera 520 and/or another vehicle.

In some embodiments, the analysis engine 530 may be configured to send commands to the AV operating components 540 based on the analysis performed. For example, the analysis engine 530 may instruct braking components of the AV operating components 540 to engage to slow and/or stop the vehicle. As another example, the analysis engine 530 may instruct the AV operating components 540 to decrease or completely cease application of a motive force. As an additional example, the analysis engine 530 may instruct the AV operating components 540 to adjust steering or other directionality control of the vehicle.

In some embodiments, the system 500 may be self-contained and or closed from other components or systems of a vehicle. For example, the system 500 may operate independently of other control or guidance systems and may function to provide collision avoidance. In these and other embodiments, the commands from the analysis engine 530 to the AV operating components 540 may override instructions from one or more other systems or components of the vehicle to the AV operating components 540. In some embodiments, the system 500 may be an open system and may interact with other components or systems of a vehicle, such as by using information, providing information, receiving instructions, providing instructions, etc.

One or more embodiments of the present disclosure may be implemented using computing devices, such as a device with a processor and/or a memory. Generally, the processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Additionally, the processor may include any number of processors distributed across any number of network or physical locations that are configured to perform individually or collectively any number of operations described in the present disclosure. In some embodiments, the processor may interpret and/or execute program instructions and/or process data stored in the memory, the data storage, or the memory and the data storage. In some embodiments, the processor may fetch program instructions from the data storage and load the program instructions into the memory.

After the program instructions are loaded into the memory, the processor may execute the program instructions, such as instructions to perform any of the operations of the present disclosure.

The memory and the data storage may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. In some embodiments, the computing system may or may not include either of the memory and the data storage.

By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store desired program code in the form of computer-executable instructions or data structures and which may be accessed by a general-purpose or special-purpose computer. The non-transitory computer-readable medium may have stored therein executable code with instructions for the performance of operations. Combinations of the above may also be included within the scope of computer-readable storage media. Computer-executable instructions may include, for example, instructions and data configured to cause the processor 910 to perform a certain operation or group of operations.

The communication unit may include any component, device, system, or combination thereof that is configured to transmit or receive information over a network. In some embodiments, the communication unit may communicate with other devices at other locations, the same location, or even other components within the same system. For example, the communication unit may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit may allow the computing system to communicate with other systems, such as computing devices and/or other networks, or even other AVs.

In some embodiments, an AV may include a secondary computing system that generates virtual bumpers in addition to a primary computing system that may provide general navigation and vehicle coordination. For example, the primary computing system may utilize input from the various sensors of the AV and instructions regarding a destination and may provide instructions to various subsystems of the AV, such as steering, throttle, braking, etc. to direct the AV in operation.

In some embodiments, the secondary computing system may be configured with a simplified system in comparison with the primary computing system. For example, the secondary computing device may receive data from one or more of the sensors of the AV and use that data to determine locations of obstacles to the AV. In some embodiments, the data from the sensors may be provided to the secondary computing system from the primary computing system. the primary computing device from the camera and/or radar sensors to determine a location of one or more obstacles proximate the AV. The secondary computing system may send a query to the primary computing system regarding a given obstacle. If the primary computing system responds indicating it is aware of the given obstacle, the secondary computing system may continue to monitor the location of the obstacle relative to the AV. If there is no response or an inappropriate or unexpected response from the primary computing system, the secondary computing system may invoke one or more override mechanisms. For example, the secondary computing system may invoke a braking mechanism, an emergency braking system, etc. to stop the AV. Additionally or alternatively, the secondary computing system may override a throttle or other speed controlling system to decrease the speed of/decelerate the AV.

While various embodiments are described with reference to Lidar, camera, and/or combinations thereof, it will be appreciated that the present disclosure is not limited to such a combination of sensors. To generate virtual bumpers, other sensors may be utilized in addition to, or instead of, such sensors. For example, some embodiments may utilize a Lidar and/or an ultrasonic sensor. As another example, one or more sonar sensors may be utilized. As another example, sensors such as speed sensors, brake pressure sensors, GPS sensors, etc. may all be a part of a suite of sensors to inform the AV with information that may facilitate the formation of and utilization of virtual bumpers.

Figure 6:
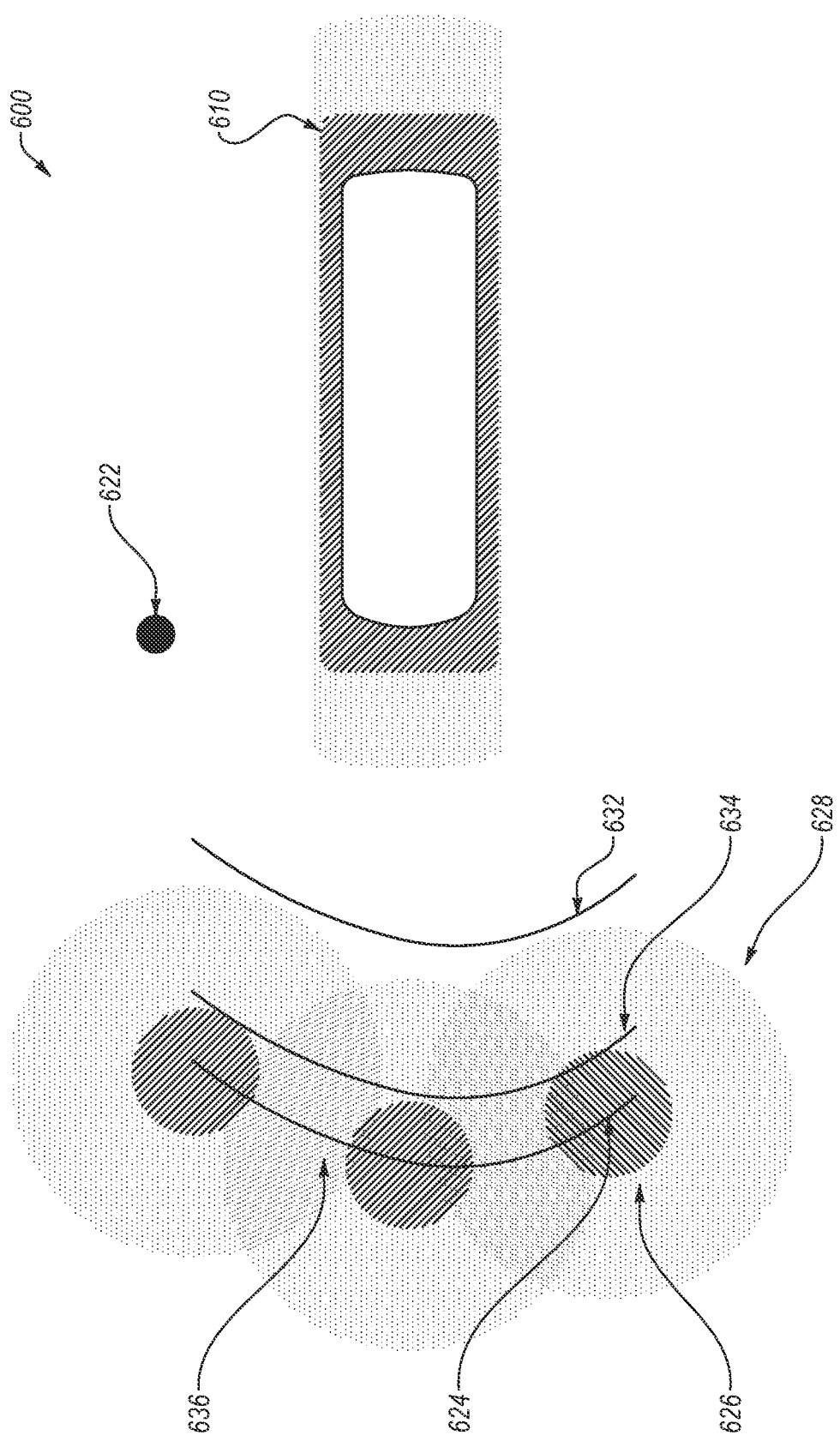
FIG. 6 illustrates another example system of implementing virtual bumpers for a vehicle.

FIG. 6 illustrates another example system 600 of implementing virtual bumpers for an AV, in accordance with one or more embodiments of the present disclosure. The system 600 may include the AV 610, a side obstacle 622 and a forward obstacle 624. The system 600 may implement one or more layers of virtual bumpers, such as a braking bumper 626, and a speed adjusting bumper 628. Additionally, in some embodiments, a combination of such bumpers may form a speed adjusting barrier 632, a braking adjusting barrier 634, and/or an obstacle collision barrier 636.

In some embodiments, the AV 610 may utilize one or more sensors to detect obstacles, such as the side obstacle 622 and/or the forward obstacle 624. In some embodiments, a virtual bumper may not be generated for the side obstacle 622 as the side obstacle is not within a field of potential travel for the AV. Additionally or alternatively, virtual bumpers may be generated for all or just some obstacles.

In some embodiments, the AV 610 may generate the braking bumper 626 as the distance the AV 610 may utilize to come to a complete stop and thus not hit the obstacle 624 if the braking system or systems are engaged. In some embodiments, the braking bumper 626 may be a variable size based on a variety of factors, including vehicle speed (higher speeds generating larger bumpers), road conditions (slick roads or gravel roads generating larger bumpers), vehicle load (full vehicles generating larger bumpers), weather (rain/snow generating larger bumpers), external temperature (excessively high temperatures generating larger bumpers), type of cargo (fragile cargo like livestock or human passengers generating larger bumpers), distance from obstacle, etc.

In some embodiments, the AV 610 may generate the speed bumper 628 as the distance the AV 610 may utilize to come to a stop and thus not hit the obstacle 624 if the throttle system is disabled such that no additional acceleration is engaged for the AV 610. In these and other embodiments, the speed bumper 628 size may be determined based on similar or comparable factors as the braking bumper 626. In some embodiments, the speed bumper 628 may include considerations of the braking bumper 626 such that the speed bumper may represent the distance to decelerate to a point where it is safe and/or desirable for the braking system to take over the stopping of the AV 610 at the braking bumper 626, rather than when the AV 610 may come to a complete stop.

In some embodiments, with multiple obstacles, the AV 610 may generate one or more barriers, such as the speed adjusting barrier 632, the braking adjusting barrier 634, and/or the obstacle collision barrier 636. The speed adjusting barrier 632 may include a barrier connecting a leading edge of each of the speed bumpers for the obstacles within a potential travel path of the AV 610. The braking adjusting barrier 634 may include a barrier connecting a leading edge of each of the braking adjusting bumpers for the obstacles within a potential travel path of the AV 610. The obstacle collision barrier 636 may include a barrier connecting each of the obstacles within the potential travel path of the AV 610. In these and other embodiments, the various barriers may be used as a threshold across which, if the AV 610 crosses, the various responses described herein may be invoked.

In some embodiments, the AV 610 may utilize data from local sensors located on the AV 610 to perform the analysis for generating and analyzing the virtual bumpers. In some embodiments, the AV 610 may operate such that one or both of the primary computing system or the secondary computing system may communicate over a network with a remote computing system. In these and other embodiments, the contextual data utilized by the AV 610 to determine the location of obstacles, the location of the various barriers, etc. may be based on data provided by the remote computing device rather than data collected from the local sensors of the AV 610. Additionally or alternatively, such determinations may be based on both local sensor data and data from the remote computing system.

As used in the present disclosure, the terms "user device" or "computing device" or "non-transitory computer readable medium" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing device" may be any computing system as previously defined in the present disclosure, or any module or combination of modules running on a computing device.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, and/or others) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

What is claimed is:

1. An autonomous vehicle (AV) comprising:
   a plurality of sensor systems, including:
      at least two sensor systems proximate a back of the AV and oriented in a forward-facing orientation; and
      at least one sensor system proximate a front of the AV and oriented in the forward-facing orientation;
   wherein each of the plurality of sensor systems includes:
      a two-dimensional Lidar device; and
      a camera device; and
   wherein the AV is configured to generate a plurality of virtual bumpers around the AV, the virtual bumpers representing a space around the AV greater than an actual size of the AV.

2. The AV of claim 1, wherein the two-dimensional Lidar device of at least two of the sensor systems are at approximately a bumper height of the AV.

3. The AV of claim 1, wherein the camera device is oriented to capture portions of an image above a capture beam of the two-dimensional Lidar device and portions of the image below the capture beam of the two-dimensional Lidar device.

4. The AV of claim 1, wherein
   two images captured by two of the camera devices are used by the AV to generate a stereoscopic image; and
   the stereoscopic image is used in conjunction with Lidar data captured by at least one of the two-dimensional Lidar devices to verify distance to an object observed in the stereoscopic image and in the Lidar data.

5. The AV of claim 1, wherein:
   the AV is configured to maintain a vehicle profile of the AV; and
   the plurality of virtual bumpers are based on the vehicle profile.

6. The AV of claim 5, wherein the vehicle profile of the AV includes at least one of braking capabilities of the AV, a current velocity of the AV, and a current direction of travel of the AV.

7. The AV of claim 6, wherein the vehicle profile of the AV includes the current velocity of the AV, the current velocity determined based on a combination of a velocity of a moving object as determined based on first readings of at least one of the sensor systems and a velocity of the AV relative to a fixed object as determined based on second readings of at least one of the sensor systems.

8. The AV of claim 1, further comprising an analysis engine configured to:
   determine a minimum distance to collision between the AV and an object; and
   send a braking signal in response to the minimum distance being below a threshold.

9. The AV of claim 8, wherein the analysis engine is a self-contained system separate from other control or guidance systems of the AV.

10. The AV of claim 9, wherein the analysis engine is override instructions from the other control or guidance systems of the AV.

11. The AV of claim 1, wherein the AV is configured to generate a speed bumper corresponding to a first distance to come to a stop when a throttle system is engaged, and a braking bumper corresponding to a second distance to come to a stop when a braking system is engaged.

12. The AV of claim 11, wherein the braking bumper is based on factors including at least two of a speed of the AV, road conditions, a vehicle load of the AV, weather, external temperature, type of cargo carried by the AV, and distance from an obstacle.

13. The AV of claim 11, wherein the AV is configured to implement a speed adjusting barrier along a leading edge of the speed bumper, a braking adjusting barrier along a leading edge of the braking bumper, and an obstacle collision barrier at an intersection point between a potential travel path of the AV and an object, wherein the potential travel path is determined based on a current direction of travel of the AV and a current velocity of the AV.

\* \* \* \* \*